(12) United States Patent
Chen et al.

(10) Patent No.: US 8,621,589 B2
(45) Date of Patent: Dec. 31, 2013

(54) CROSS DOMAIN SINGLE SIGN ON

(75) Inventors: Li Long Chen, Beijing (CN); Elaine Zhan, Austin, TX (US); Lin Zhi Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/342,237

(22) Filed: Jan. 3, 2012

(65) Prior Publication Data

US 2013/0014243 A1    Jan. 10, 2013

(30) Foreign Application Priority Data

Dec. 31, 2010   (CN) .......................... 2010 1 0618294

(51) Int. Cl.
*G06F 21/00*            (2013.01)
(52) U.S. Cl.
USPC ............................................................ 726/8
(58) Field of Classification Search
USPC ............................................................ 726/8
See application file for complete search history.

(56) References Cited

U.S. PATENT DOCUMENTS

| | | | |
|---|---|---|---|
| 7,219,152 B2 | 5/2007 | Komisky | |
| 7,657,639 B2 * | 2/2010 | Hinton | 709/229 |
| 2006/0021019 A1 | 1/2006 | Hinton et al. | |
| 2007/0234417 A1 * | 10/2007 | Blakley, III et al. | 726/12 |
| 2008/0021997 A1 * | 1/2008 | Hinton | 709/225 |
| 2008/0271121 A1 | 10/2008 | Hinton et al. | |
| 2010/0024015 A1 | 1/2010 | Hardt | |
| 2010/0115598 A1 | 5/2010 | Barriga et al. | |

OTHER PUBLICATIONS

Moss et al., A Unified Authentication Framework for Accessing Heterogeneous Web Services, Proceedings—International Conference on Next Generation Web Services Practices, NWeSP 2008, p. 117-122, 2008.

* cited by examiner

*Primary Examiner* — Kambiz Zand
*Assistant Examiner* — Aubrey Wyszynski
(74) *Attorney, Agent, or Firm* — Yudell Isidore Ng Russell PLLC

(57) ABSTRACT

The present application provides a method and system for Cross Domain Single Sign On. The method comprises: receiving a request from a user to a service provider; processing the user request prior to relaying the request to the service provider; forwarding the processed request to the corresponding service provider according to the type of request; in response to receiving a response to the request from the service provider, processing the response, and forwarding the processed response to the user. By adopting the method and system of the present application, a Single Sign On management proxy is introduced as a united management system for a session lifetime of the user. The SSO management proxy manages operations of logging in, checking a session expiration and recovering, logging out, URL mapping, error processing, and access control, and effectively improves the availability, security, functional continuity of the service as well as the user's experience.

18 Claims, 6 Drawing Sheets ature of the present application claims benefit of priority under 35 USC §120 and §365 to the previously filed China Patent Application No. 201010618294.6 titled, "Cross Domain Single Sign On" with a priority date of Dec. 31, 2010. The content of that application is incorporated by reference herein.

CROSS DOMAIN SINGLE SIGN ON

PRIORITY CLAIM

The present application claims benefit of priority under 35 USC §120 and §365 to the previously filed China Patent Application No. 201010618294.6 titled, "Cross Domain Single Sign On" with a priority date of Dec. 31, 2010. The content of that application is incorporated by reference herein.

TECHNICAL FIELD

The present disclosure relates to computer-supported user access to services via Single Sign On, and in particular to a method and system for Cross Domain Single Sign On.

DESCRIPTION OF THE RELATED ART

Single Sign On (SSO) is one of several currently popular solutions for corporate business integration. The definition of SSO is that a user can access all application systems or services only by signing on once in a plurality of application systems or services which are mutually trusted. When the user accesses an application program such as service 1 for the first time, he would be directed to an authentication system to perform a sign on operation. After the authentication system has authenticated the identity of the user, a token or assertion is returned to the user as an authentication proof. In this way, when the user attempts to access another application program, such as service 2, with the previously generated token, after a user request is received, service 2 sends the token provided by the user to the authentication system to perform authentication so as to validate the token. If the token passes the authentication, the user can access service 2 or other services without signing on again.

As for achieving a redirection across portals, it requires that user information transfer among different portals in different domains is achieved through Cross Domain SSO (CDSSO).

Now there are already various technologies to achieve the CDSSO, however, in the conventional technology for CDSSO, a session lifetime for the user in various integrated applications is not synchronous, which results in the user not being able to continue to use the integration solution. For example, if the session for the user in the service 1 is not expired, but the session in the service 2 is expired, a process for service 2 can not be continued after a process for service 1 is complete.

In addition, the present Single Sign On technology relies on an automatic redirection of a client browser. When a user logs out from an application, it is necessary to traverse the logout pages of all applications in the user's browser, which provides a poor user experience; moreover, if the user is forced to shut down before the browser finishes all the redirections, it will cause a security issue.

SUMMARY

Thus, the present disclosure provides a method and system for improving the conventional Cross Domain Single Sign On technology.

According to one embodiment of the present disclosure, there is provided a processing method for Single Sign On, wherein at least one service provider to be accessed by a user is located in at least one domain. The method comprises: receiving a user request designated for the at least one service provider from the user; processing the request according to the type of request; sending the processed user request to the at least one service provider; receiving a response from the at least one service provider; and sending the response to the user request back to the user.

According to another embodiment of the present disclosure, there is provided a system for Single Sign On, wherein at least one service provider to be accessed by a user is located in at least one domain. The system comprises: computer executable code configured to receive a user request designated for the at least one service provider from the user; computer executable code configured to process the request according to the type of request; computer executable code for sending the processed user request to the at least one service provider; computer executable code configured to receive a response from the at least one service provider; and computer executable code configured to send the response to the user request back to the user.

By adopting the method and system of the present application, a Single Sign On management proxy is introduced as a united management system for a session lifetime of the user, including operations of checking a session expiration, recovering logging out, URL mapping, error processing, access control, and effectively improves the availability, security, functional continuity of the service as well as the user's experience.

BRIEF DESCRIPTION OF THE DRAWINGS

The above features and advantages of the present disclosure will become more apparent from a more detailed description of exemplary embodiments of the present disclosure illustrated in accompanying drawings, wherein.

DETAILED DESCRIPTION

The present disclosure will be described below with reference to the method and/or apparatus according to embodiments of the present disclosure. Each block of the flowcharts and/or block diagrams and combinations of blocks in the flowcharts and/or block diagrams, can be implemented by computer program instructions. These computer program instructions may be provided to a processor of a general purpose computer, special purpose computer, or other programmable data processing apparatus, thereby producing a machine, such that the instructions, when executed by the computer or other programmable data processing apparatus, causes the computer/apparatus to implement the functions/operations specified in the block or blocks in the flowcharts and/or block diagrams.

These computer program instructions may also be stored in a computer-readable medium that can direct a computer or other programmable data processing apparatus to function in a particular manner, such that the instructions stored in the computer-readable medium produce an article of manufacture including instructions implementing the function(s)/operation(s) specified in the block or blocks in the flowcharts and/or block diagrams when executed by a processing device.

The computer program instructions may also be loaded onto a computer or other programmable data processing apparatus to cause a series of operation steps to be performed on the computer or other programmable data processing apparatus to generate a computer implemented process such that the instructions which execute on the computer or other programmable data processing apparatus provide processes for implementing the function(s)/operation(s) specified in the block or blocks in the flowcharts and/or block diagrams.

The processing method and system for Cross Domain Single Sign On (SSO) of the present disclosure uses an SSO management proxy as a united management system for a session lifetime of a user. Both a request for a service from the user and a response to the user's request from the service are processed through the SSO management proxy, which makes the user session lifetimes synchronize with each other across various integrated applications, and efficiently improves the functional continuity of the service.

Figure 1:
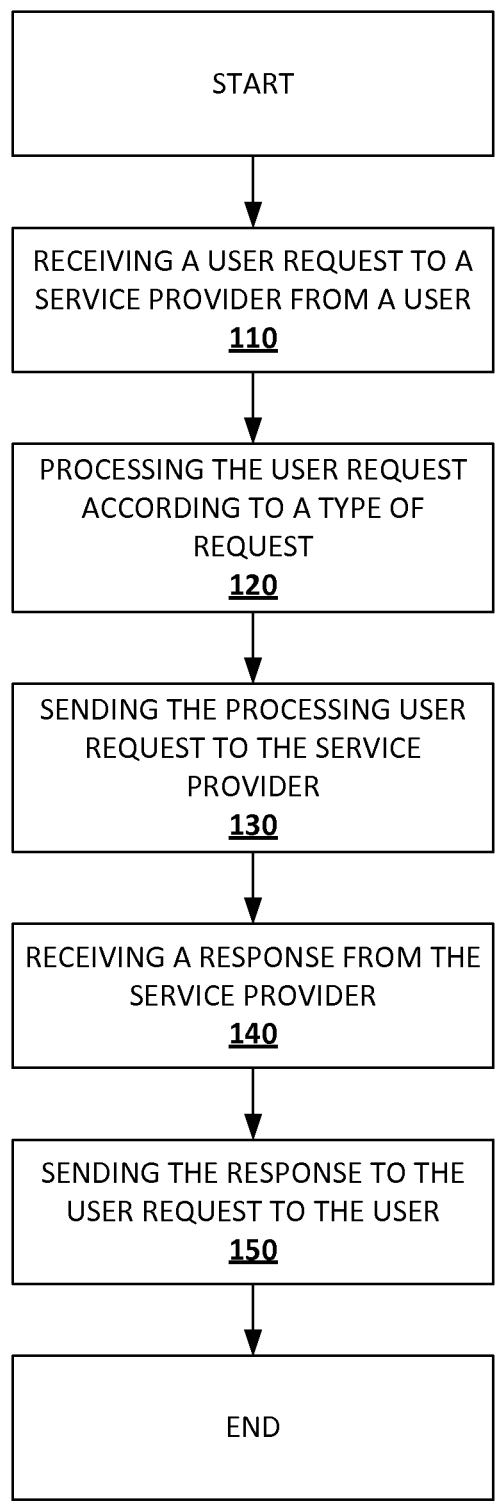
FIG. 1 illustrates a flowchart of a processing method for Cross Domain SSO according to an embodiment of the present disclosure.

FIG. 1 illustrates a processing method for SSO according to an embodiment of the present disclosure, wherein, at least one service provider accessed by a user can be located on a different domain. Firstly, in step 110, a user request to a service provider is received from the user. In step 120, the request is processed according to the type of request. The type of request can be determined according to what kind of operation or which kind of application is requested. For example, the type of request can be determined by which service provider the request is sent to or whether the request is an initial access (logon) request, logout request, a general access request, and so on. In step 130, based on the request, the processed user request is sent to the corresponding service provider, as seen from embodiments of the present disclosure described later. The corresponding service provider can be the service provider asked for by the user request, or the corresponding service provider can include other related service providers. For example, in the case of a logout request, not only is the logout request sent to the requested service provider, but also the logout request can be sent to other service providers having an active session with the user to ensure the consistency of the session lifetime. In step 140, a response is received from the service provider. In step 150, the response to the user request is sent to the user.

In the above described process with reference to FIG. 1, the user request can be an initial access request, a logout request, a general access request, and so on. A procedure of how to perform the process for various types of requests according to another embodiment of the present disclosure will be described in detail below with reference to FIG. 2.

Figure 2:
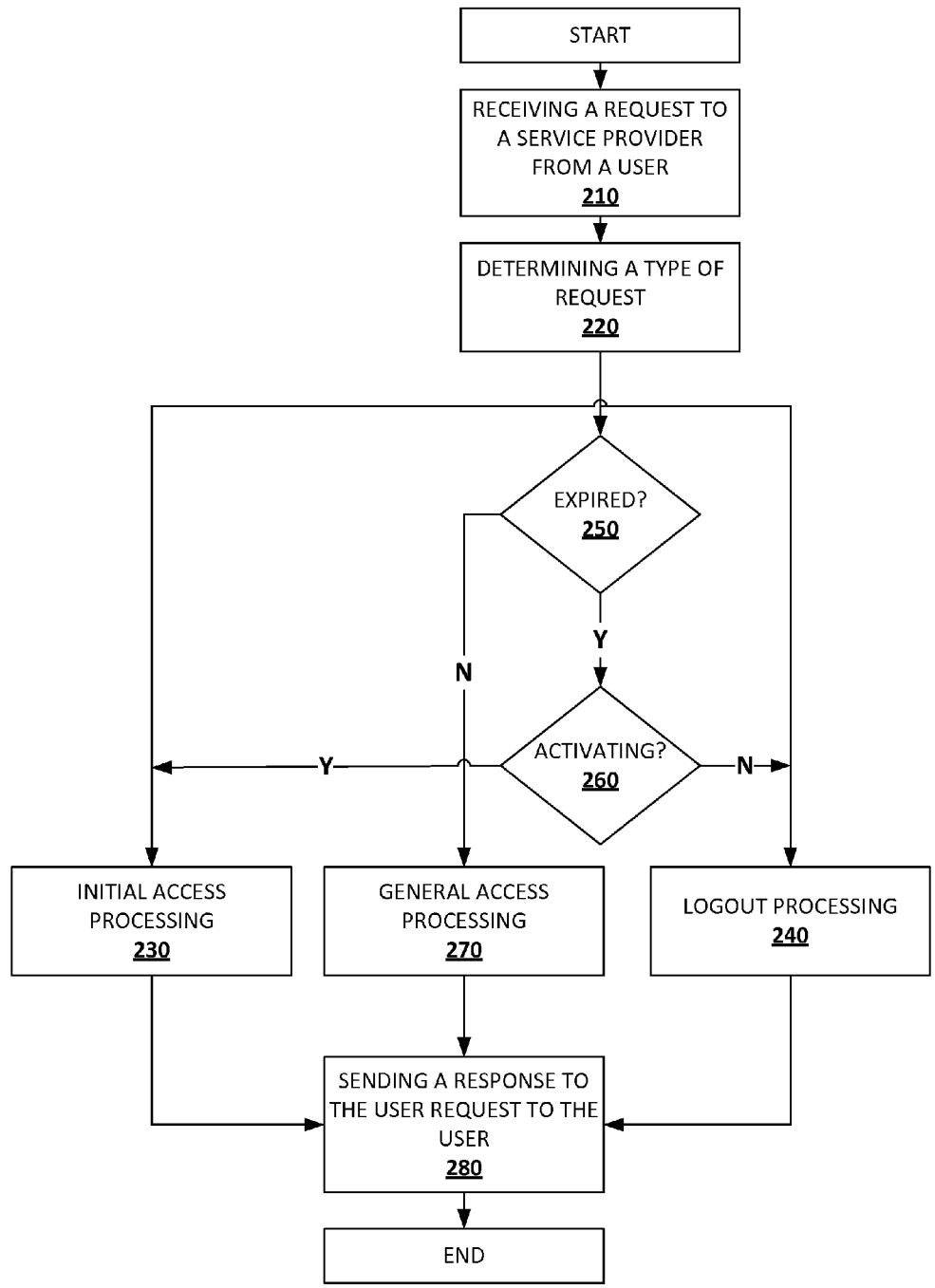
FIG. 2 illustrates a flowchart of a processing method for Cross Domain SSO according to another embodiment of the present disclosure.

FIG. 2 illustrates a processing method for Cross Domain SSO according to another embodiment of the present disclosure. Firstly, similar to step 110 described above with reference to FIG. 1 in step 210, a request to a service provider is received from a user.

In step 220, the type of the request is determined. If the request is an initial access request, for example, the initial access request to a service provider SP1 from the user, then the workflow proceeds to step 230 to execute an initial access operation. If the request is a logout request, for example, the logout request to the service provider SP1 from the user, then the workflow proceeds to step 240 to execute a logout operation. If the request is a general access request, then the workflow proceeds to step 250 to process.

In step 250, it is determined whether a session on the requested service provider has expired. If not, then the method proceeds to step 270 to perform a general access process; if the session has expired, then in step 260, a determination is made whether to reactivate the operation with the service provider or logout the session. If the reactivation option is determined, then the method proceeds to step 230 to reactivate through the same method as the operation processing the logon request. If it is determined to log-out the session, then the method proceeds to step 240 to perform the logout operation.

According to an embodiment of the present application, if the session on the requested service provider has expired, then in step 260, a determination is made whether currently there is an active session between the user and another service provider. If there is an active session between the user and another service provider, then the session between the user and the service provider is reactivated.

Or, according to another embodiment of the present application, if the session on the requested service provider has expired, and the time since the session expired has exceeded a predetermined threshold time, then both the session between the user and the designated service provider as well as the session between the user and the other service provider will be logged out. If the time since the session expired has not exceeded the threshold time and at the same time there is an active session between the user and the other service provider, then the session between the user and the service provider is reactivated. In step 280, the corresponding response is returned to the user according to the processing result.

According to an embodiment of the present disclosure, the SSO management proxy can convert a URL of the response returned from the service provider into a united domain and provide the converted response to the user. In this way, the URLs seen by the user are all the URLs in the united domain converted through the SSO management proxy, which are consistent with the URLs placed in the favorites' folder. The user perception is similar to using a single application on a single domain; Therefore the user has a better experience.

According to an embodiment of the present disclosure, in executing the logout operation in FIG. 2, after receiving a user request to log out from the requested service provider, the SSO management proxy forwards the logout request to the service provider. After receiving the logout response from the service provider, the logout request is also sent to all other service providers having an active session through the SSO management proxy, so as to log out the user from the other service providers having an active session. Finally, a message of successful logout is returned to the user. As a result, the user will not perceive a redirection among a plurality of successive application pages to be logged out, but the plurality of applications are seamlessly integrated as a single application in a single domain. Thus, when performing the logout, the issue of redirecting back and forth among the logout pages of different applications or forgetting to log out some applications will not occur. The user has a better experience, and a higher level of security is achieved.

Figure 3:
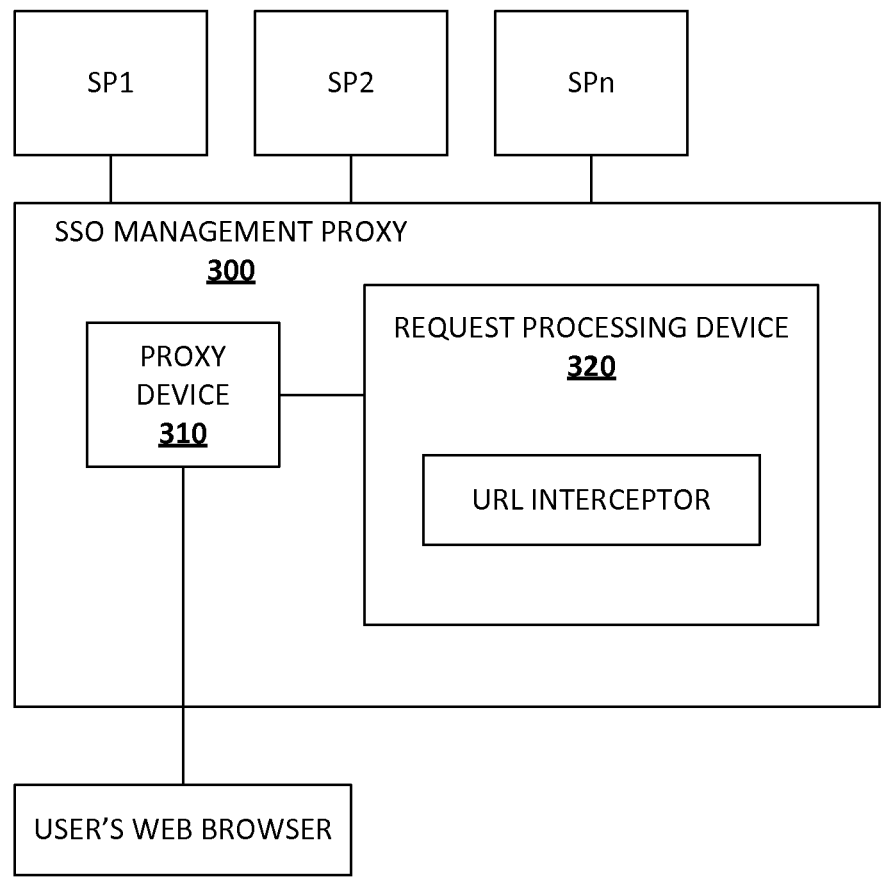
FIG. 3 illustrates a block diagram of a management proxy system for Cross Domain SSO according to an embodiment of the present disclosure.

FIG. 3 illustrates a block diagram of an SSO management proxy system 300 for Single Sign On according to an embodiment of the present disclosure. As shown in FIG. 3, the Single Sign On (SSO) management proxy system 300 can include a proxy device 310 and a request processing device 320, wherein the request processing device 320 includes a URL interceptor for intercepting a request from a user. The proxy device 310 is used to receive the request sent to a service provider from the user, forward the user request to the corresponding service provider, forward a response from the service provider to the user, and so on. As described above, the request can be an initial access request, a logout request, a general access request, directed to a specific service provider. The request processing device processes different responses to the user request from the service provider according to the various types of request.

The sign on process, general access process, and logout process according to embodiments of the present disclosure will be described below in detail with reference to the specific embodiments shown in FIGS. 4 through 6, respectively.

Figure 4:
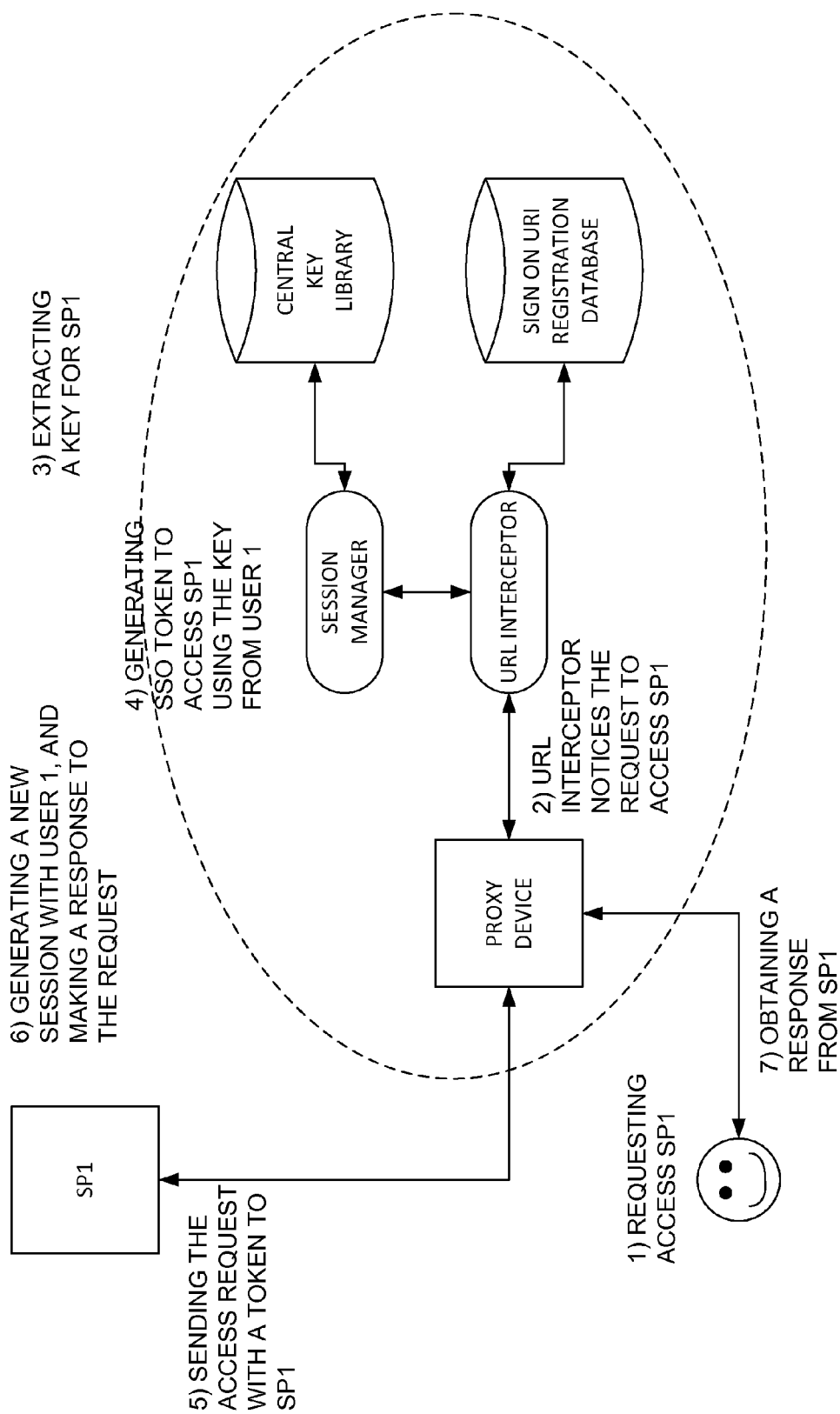
FIG. 4 illustrates an initial access process of Cross Domain SSO according to an embodiment of the present disclosure.

FIG. 4 illustrates a sign on process of Cross Domain SSO according to an embodiment of the present disclosure. First, the user has signed on a Software-as-a-Service (SaaS) portal website so as to access the service provided by the service provider SP1 through a browser. The user's http request for accessing SP1 is intercepted by the SSO management proxy system. For example, the user's http request is found by a URL interceptor in the SSO management proxy. If the URL interceptor finds that the user does not have an http session at SP1, then the URL interceptor is ready to help the user produce the http session. These actions are transparent to the user. For example, a session manager can obtain a key from a central key library to produce a token accepted by SP1, and thus a confirmed SP1 token is generated for the user. The SSO management proxy system sends the user's access request to SP1, along with the confirmed token. SP1 authenticates the token, generates the SP1 http session for the user, and returns the resource (e.g. a webpage) requested by the user to the SSO management proxy system, which in turn returns the resource to the client browser, enabling the user to browse the desired resource. The above described process of accessing SP1 through the SSO management proxy system is completely transparent to the user.

According to an embodiment of the present disclosure, after receiving the resource returned by SP1, the SSO management proxy system can convert the URL of the resource into the united domain, and return the converted URL to the client browser, such that what the user has viewed is consistent with the URL placed in the favorites folder for services provided by different service providers. This process is, similar to using a single application on a single domain.

An example of the SSO sign on process according to an embodiment of the present disclosure is as follows:
(1) the user signs on service 1, the SSO management proxy intercepts the user request and forwards it to service 1 provided by a service provider SP1; after successfully authenticating and establishing a user session, the SSO management proxy converts the URL of service 1 into a united domain and returns a response obtained from service 1 to the user.
(2) the user next accesses service 2 provided by a service provider SP2; the SSO management proxy intercepts the user request, finds that the user has signed on successfully, then generates an SSO token and forwards the SSO token to service 2 to establish a user session; the SSO management proxy maps the URL of service 2 to the united domain and returns a response obtained from service 2 to the user.

In this case, the URLs that the user has viewed are all the URLs in the united domain converted through the SSO management proxy, and the URLs viewed by the user are consistent for different services, just as using a single application on a single domain; therefore the user has a better experience.

Figure 5:
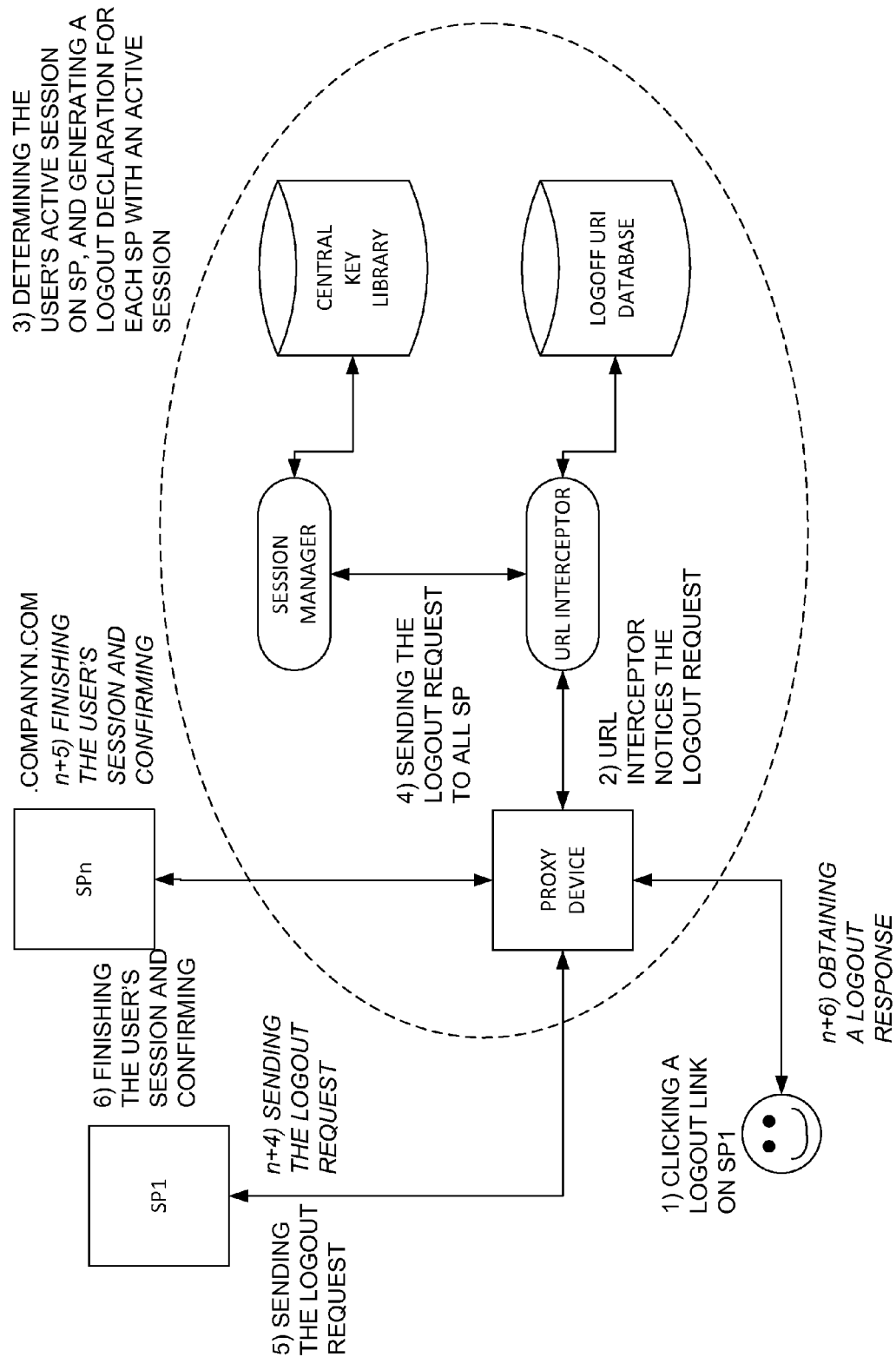
FIG. 5 illustrates a logout process of Cross Domain SSO according to an embodiment of the present disclosure.

FIG. 5 illustrates a logout process of Cross Domain SSO according to an embodiment of the present disclosure. First, when the user browses a webpage on a website of service provider SP1, if the user wants to logout, the user then clicks a logout link in SP1 in order to send a request to logout from SP1. The logout action is detected by the URL interceptor. In order to ensure the user's network security, the SSO management proxy needs to concurrently logout the user's other sessions with all the service providers to maintain the consistency of the sessions. If this is not done, a hacker might input the URL using his browser to access one of the service providers, thereby performing operations with the user's identity, which would cause a threat to the user's network security. Therefore, after receiving the user's logout request, the SSO management proxy queries whether the user's sessions at other service providers are active and effective. If the user's sessions are active and effective, then there is a requirement that these sessions be logged out concurrently at other service providers. The SSO management proxy sends a logout command to servers of all the service providers, and these service providers logout the user's sessions and return a confirmation to the SSO management proxy. The SSO management proxy then sends a message to the user that the other sessions have been logged out. Consequently, although the user only logs out from the website of service provider SP1, the user has actually logged out from the websites of all the service providers.

An example of a logout process according to an embodiment of the present disclosure is as follows, wherein an assumption is made that the user has successfully signed on via SSO using the browser and can access an integrated solution including service 1 and service 2.
(1) the user accesses service 1; the SSO management proxy intercepts the user request and forwards the request to service 1, and confirms that the user's session in service 1 is active and effective; the SSO management proxy system, accesses service 1 and returns the obtained response to the user.
(2) the user next accesses service 2; the SSO management proxy intercepts the user request and forwards the request to service 2, and confirms that the user's session in service 2 is active and effective; the SSO management proxy system accesses service 2 and returns the obtained response to the user.
(3) the user logs out from service 1; the SSO management proxy intercepts the user request, and automatically logs out all services for which the user's sessions are active, such as service 1 and service 2, and finally returns the message about the successful logout to the user.

In such a case, the user does not detect the redirection among a plurality of successive application pages to be logged out, but the plurality of applications is a seamless integration comparable to a single application on a single domain. Thus, when performing the logout, the issue of redirecting back and forth among the logout pages of different applications or forgetting to log out from some applications will not occur. Consequently, the user has a better experience, and a higher level of security is achieved.

Figure 6:
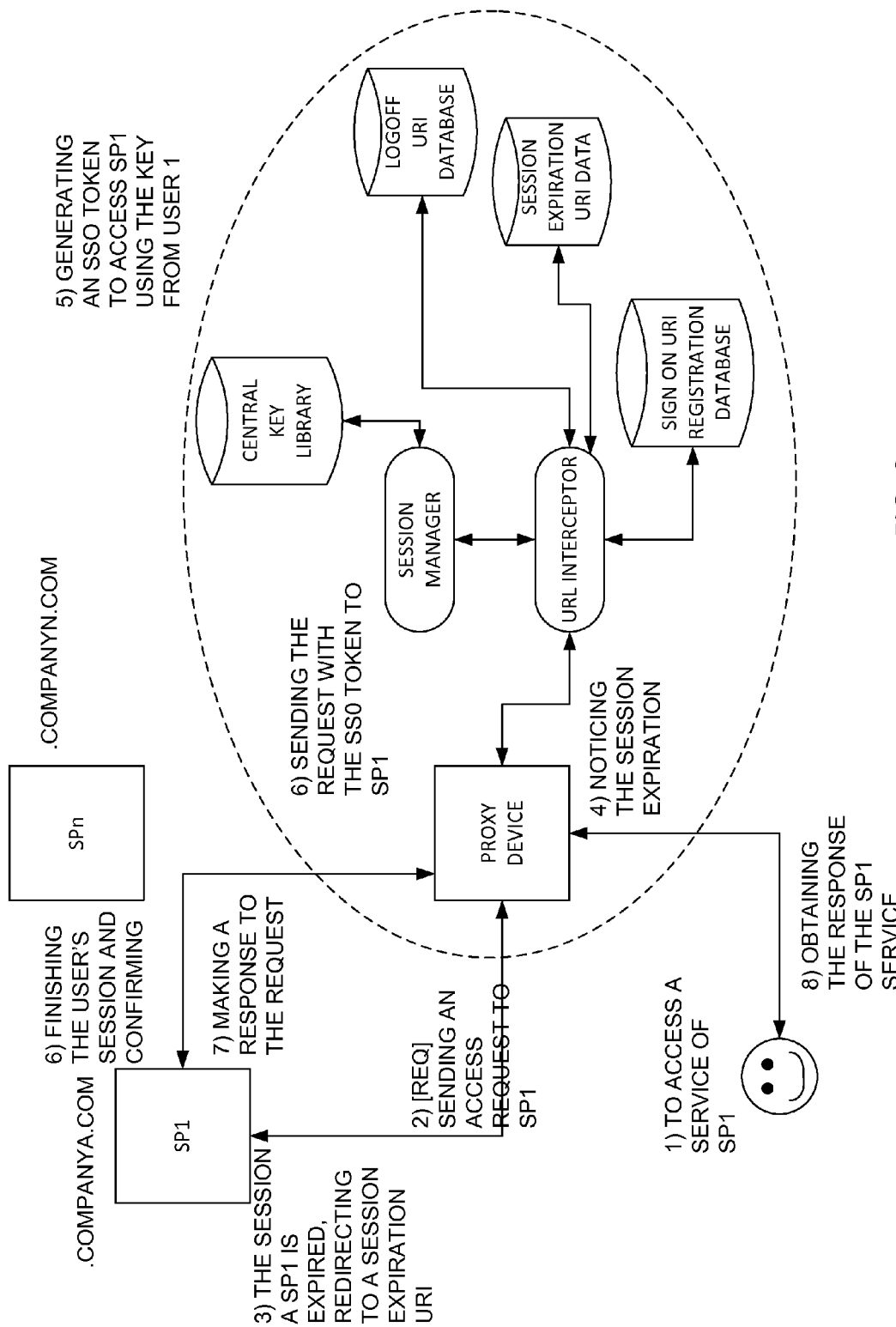
FIG. 6 illustrates an operation process for a session expiration of Cross Domain SSO according to an embodiment of the present disclosure.

FIG. 6 illustrates an operation process for a session expiration of Cross Domain SSO according to an embodiment of the present disclosure. If the user has signed on to the SP1 service and wants to access SP1 again after leaving for a while, then the access request is sent to the SSO management proxy. The SSO management proxy in turn forwards the request to SP1. A response is sent from SP1 indicating that the user's session has expired for SP1, and SP1 sends the SSO management proxy a redirection request directing the SSO management proxy to a session expiration page. The SSO management proxy determines whether to reactivate the user's session at SP1 or logout the session according to a pre-stored policy after receiving the session expiration event. If the decision is to reactivate the user's session at SP1, SSO management proxy can then generate a user's Single Sign On token for SP1 using the aforementioned method for initially accessing SP1. The SSO management proxy sends the generated SSO user token for SP1 and the original resource being requested to SP1. At SP1, the user's session is reactivated, and SP1 returns the resource requested by the user.

An example of the operation process for session expiration according to an embodiment of the present disclosure is as follows, where an assumption is made that the user has successfully completed a Single Signed On using the browser, and can access the integrated solution including service 1 and service 2.

(1) the user accesses service 1; the SSO management proxy intercepts the user request, forwards the request to service 1, and confirms that the user's session in service 1 is active and effective; the SSO management proxy accesses service 1 and returns the obtained response to the user.

(2) the user next accesses service 2; the SSO management proxy intercepts the user request and forwards the request to service 2, and confirms that the user's session in service 2 is active and effective; the SSO management proxy, accesses service 2 and returns the obtained response to the user.

(3) the user accesses service 1 again after staying on service 2 for a while, and the SSO management proxy intercepts the user request and forwards the request to service 1. Because service 1 has not been accessed for a long time, the user's session in service 1 is expired. Although the user's session in service 1 is expired, the SSO management proxy confirms that the user's session is still active for the whole integrated application, so the SSO management proxy gets the user's SSO token from an identity provision program included automatically and re-establishes the user's session in service 1. The SSO management proxy then accesses service 1 and returns the obtained response to the user.

Thus, the situation where the user can access service 2 while access to service 1 is expired and the user has to re-logon to access service 1 will not occur. Under such a situation, the user will not experience a session expiration and recovery process and may continue to use the integrated solution of the entire cross domain. The user has a better experience and greater satisfaction with the integrated solution. Moreover, after different applications have been integrated into a united solution, such as the integration of shopping website and payment system, there is consistent session expiration management, so the described processes can avoid a non-synchronization problem for the session lifetime, and be more secure. After different applications have been integrated into a united solution, a flow link between functions will not be interrupted due to the non-synchronization of the session lifetime, thus the described processes can reduce the cost of customer technical support.

According to an embodiment of the present disclosure, the described processes can also perform a central authorization check through the SSO management proxy system. For example, if the user wants to access a certain resource on service provider SP1, such as a resource with a path: ${context}/constraint-service-1, then after receiving the request from the user, the SSO management proxy checks whether the requested URL belongs to a user access restricted resource. If yes, the user is not allowed to access the resource, and a page indicating that there is no authority to access the resource of SP1 is returned to the user by the proxy.

According to an embodiment of the present disclosure, the described processes can also perform central error processing through the SSO management proxy system. For example, the user sends the proxy a request to access a resource of service provider SP1, and the proxy forwards the request to SP1. If an error has just occurred in the SP1 server at the same time, then SP1 returns a response that an error has occurred (a 500 http response). At this time, the SSO management proxy system can redirect the user's browser to a page for error processing according to a predetermined policy and send an alert to the administrator of service provider SP1 as part of the evaluation data on the service provision quality by SP1.

The processing method for cross domain, SSO of the present disclosure has been described in conjunction with the specific embodiments in the foregoing. Additionally, the present disclosure also provides a system to implement the method. The system comprises a computing device/apparatus having a processor and program code executing on the processor, where the program code includes: program code configured to receive a user request to at least one service provider; program code configured to process the request according to the type of request; program code configured to send the processed user request to the designated service provider; program code configured to receive a response from the service provider; and program code configured to send the response to the request back to the user.

According to an embodiment of the present disclosure, the program code configured to process the request according to the type of request further comprises: program code configured to generate a Single Sign On token for accessing the at least one service provider if the request is an initial access request to the at least one service provider, and means configured to add the Single Sign On token to the received user request to generate the processed user request.

According to an embodiment of the present disclosure, the program code configured to process the request according to the type of the request further comprising: program code configured to generate a logout request to be sent to the at least one service provider if the request is a logout request for the at least one service provider, and program code configured to determine other service providers having an active session with the user. The system further comprising program code configured to generate a logout request to be sent to the other service providers and program code configured to send a logout request to other service providers having an active session so as to logout the user from the other service providers having the active session.

According to an embodiment of the present disclosure, the program code configured to process the request according to the type of request further comprises program code configured to determine whether a session at the requested service provider is expired based on the response from the service provider if the request is a general access request.

According to an embodiment of the present disclosure, the system further comprises program code configured to (a) determine whether there is currently an active session between the user and another service provider if the session at the requested service provider is already expired, and (b) if the session at the requested service provider is already expired, generate a request to activate a session between the user and the requested service provider as the processed user request.

According to an embodiment of the present disclosure, the system further comprising program code configured to generate a request to logout the session and the active session between the user and any other service provider as the processed user request if the session at the requested service provider is already expired and the expiration has exceeded a predetermined threshold of time.

According to an embodiment of the present disclosure, the system further comprising program code configured to (a) check whether a requested resource belongs to a user access restricted resource, in response to receiving the request to the at least one service provider from the user, and (b) in response to the requested resource belonging to a user access restricted resource, then prohibit/preventing the user from accessing the resource.

According to an embodiment of the present disclosure, the system further comprising program code configured to send a webpage for error processing to the user from the service provider according to a predetermined policy in response to receiving a response that an error has occurred at the service provider.

According to an embodiment of the present disclosure, the system further comprising program code configured to convert a URL of the response to the request received from the service provider to a URL in a united domain, as the response to the user request.

The present disclosure also provides a storage medium or device or a signal carrier, which includes instructions to perform the method according to the present disclosure.

The flowcharts and block diagrams in the drawings illustrate the architecture, functionality and operation of possible implementations of systems, methods and computer program products according to embodiments of the present disclosure. In this regard, each block in the flowcharts or block diagrams may represent a modular, program segment, or part of code, which comprises one or more executable instructions for implementing the specified logic function(s). It should also be noted that, in some alternative implementations, the functions noted in the block may also occur in an order other than that noted in the drawings. For example, two blocks consecutively shown may, in fact, be performed substantially in parallel, or sometimes they may be performed in a reverse order, depending upon the functionality involved. It will also be noted that, each block of the block diagrams and/or flowcharts and combinations of blocks in the block diagrams and/or flowcharts, can be implemented by using a special purpose hardware-based system that executes the specified functions or operations, or by using a combination of a special purpose hardware and computer instructions.

Those skilled in the art know the present disclosure may be embodied as a system, method or computer program product. Accordingly, the present disclosure may be embodied in the following forms, that is, the functionality provided by the disclosure may be an entire hardware or a combination of a software component (including firmware, resident software, microcode, etc.), and a hardware component, which are generally referred to herein as "circuit", "module" or "system". In addition, the present disclosure may also take the form of a computer program product embodied in any tangible medium of expression or device having a computer usable program code in the medium.

Any combination of one or more computer-usable or computer-readable medium/media can be used. The computer-usable or computer-readable medium may be, for example, but not limited to, an electronic, magnetic, optical, electro-magnetic, infrared or semiconductor system, apparatus, device or propagation medium. More specific examples (a non-exhaustive list) of the computer-readable medium include the following: an electrical connection with one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, electrical scanning of the paper or other medium, then compiled, interpreted, or processed in a suitable manner, and stored in computer memory if necessary. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embedded therewith, either in baseband or as part of a carrier wave. The computer-usable program code may be transmitted using any suitable medium, including, but not limited to, wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on a user's computer, as a stand-alone software package, partly on a user's computer and partly on a remote computer or entirely on a remote computer or server. In the latter scenario, the remote computer may be connected to the user's computer through any type of network, including a local area network (LAN), or a wide area network (WAN), or the connection may be made to an external computer (for example, through the Internet using an Internet Service Provider).

While the present disclosure has been described in conjunction with the preferred solutions, it can be appreciated that the above embodiments are illustrative and are not used to limit the present disclosure. Those skilled in the art can make modifications to the illustrated solutions of the present disclosure without departing from the scope and spirit of the present disclosure.

The invention claimed is:

1. A method for processing Single Sign On (SSO) via a SSO management proxy system, wherein at least one service provider to be accessed by a user device associated with a user is located in at least one domain, the method comprising:
   the SSO management proxy system receiving from a user device a request intended for at least one service provider;
   the SSO management proxy system processing the request according to a type of the request;
   in response to processing the request, the SSO management proxy system sending the processed request to the at least one service provider;
   the SSO management proxy system receiving a response from the at least one service provider;
   converting a uniform resource locator (URL) associated with the at least one service provider within the response into a converted URL that is associated with a single united domain; and in response to receiving the response from the at least one service provider, the SSO management proxy system sending the response, including the converted URL, back to the user device.

2. The method as claimed in claim 1, wherein processing the request further comprises:
in response to the type of the request being an initial access request to the at least one service provider:
generating a Single Sign On token for accessing the at least one service provider; and
adding the Single Sign On token to the received request to generate the processed request.

3. The method as claimed in claim 1, wherein processing the request further comprises:
in response to the type of the request being a logout request to the at least one service provider:
generating the logout request to be sent to the at least one service provider;
determining one or more other service providers having an active session with the user device;
generating a logout request to be sent to the one or more other service providers; and
sending the logout request to the one or more other service providers.

4. The method as claimed in claim 1, wherein processing the request further comprises:
in response to the type of request being a general access request, determining whether a session at the at least one service provider is expired based on the response from the at least one service provider.

5. The method as claimed in claim 4, further comprising:
in response to determining the session at the at least one service provider is expired, determining whether there is a currently active session between the user device and one or more other service providers; and
in response to determining there is a currently active session between the user device and the one or more other service providers, generating an activation request to activate a session between the user device and the at least one service provider as the processed request.

6. The method as claimed in claim 4, further comprising:
in response to determining the session at the at least one service provider is expired and the expiration has exceeded a predetermined threshold length of time, generating a logout request to logout said session at the at least one service provider and any other active sessions between the user device and one or more other service providers as the processed user request.

7. The method as claimed in claim 1, further comprising:
in response to receiving the request from the user device:
checking whether a requested resource associated with the request belongs to a user access restricted resource; and
in response to the requested resource belongs to the user access restricted resource, preventing the user device from accessing the requested resource.

8. The method as claimed in claim 1, further comprising:
in response to the response from the at least one service provider indicating an error has occurred at the service provider, sending a webpage for error processing to the user device according to a predetermined policy.

9. A SSO management proxy system for Single Sign On, wherein at least one service provider to be accessed by a user is located in at least one domain, the SSO management proxy system comprising:
a processing device; and
program code that when executed on the processing device enables the SSO management proxy system to:
receive from a user device a request intended for at least one service provider;
process the request according to a type of the request;
in response to processing the request, send the processed request to the at least one service provider;
receive a response from the at least one service provider;
convert a uniform resource locator (URL) associated with the at least one service provider within the response into a converted URL that is associated with a single united domain; and
in response to receiving the response from the at least one service provider, send the response, including the converted URL, back to the user.

10. The SSO management proxy system as claimed in claim 9, wherein the program code configured to process the request further comprises program code to:
in response to the type of request being an initial access request to access the at least one service provider:
generate a Single Sign On token for accessing the at least one service provider; and
add the Single Sign On token to the received request to generate the processed request.

11. The SSO management proxy system as claimed in claim 9, wherein: the program code configured to process the request further comprises program code configured to:
in response to the type of the request being a logout request to the at least one service provider:
generate a logout request to be sent to the at least one service provider
determine one or more other service providers having an active session with the user device;
generate a logout request to be sent to the one or more other service providers; and
send the logout request to the one or more other service providers.

12. The SSO management proxy system as claimed in claim 9, wherein the program code configured to process the request further comprises program code configured to:
in response to the type of request being a general access request, determine whether a session at the at least one service provider is expired based on the response from the at least one service provider.

13. The SSO management proxy system as claimed in claim 12, further comprising program code configured to:
in response to determining the session at the at least one service provider is expired, determine whether there is currently an active session between the user device and one or more other service providers; and
in response to determining there is an active session between the user device and one or more other service providers, generate an activation request to reactivate the session between the user device and the at least one service provider as the processed request.

14. The SSO management proxy system as claimed in claim 12, further comprising program code configured to:
in response to determining the session at the at least one service provider is expired and the expiration has exceeded a predetermined threshold length of time, generate a logout request to logout the session at the at least one service provider and any other active sessions between the user device and one or more other service providers as the processed user request.

15. The SSO management proxy system as claimed in claim 9, further comprising program code configured to:
  in response to receiving the request from the user device:
    check whether a requested resource associated with the request belongs to a user access restricted resource; and
    in response to the requested resource belongs to a user access restricted resource, prevent the user device from accessing the resource.

16. The SSO management proxy system as claimed in claim 9, further comprising program code configured to:
  in response to the response from the at least one service provider indicating an error has occurred at the service provider, send a webpage for error processing to the user device according to a predetermined policy.

17. The method as claimed in claim 1, further comprising:
  converting all URLs visible on the user device into URLs associated with the single united domain.

18. The SSO management proxy system as claimed in claim 9, the program code further comprising program code to:
  convert all URLs visible on the user device into URLs associated with the single united domain.

\* \* \* \* \*